Figure 1:
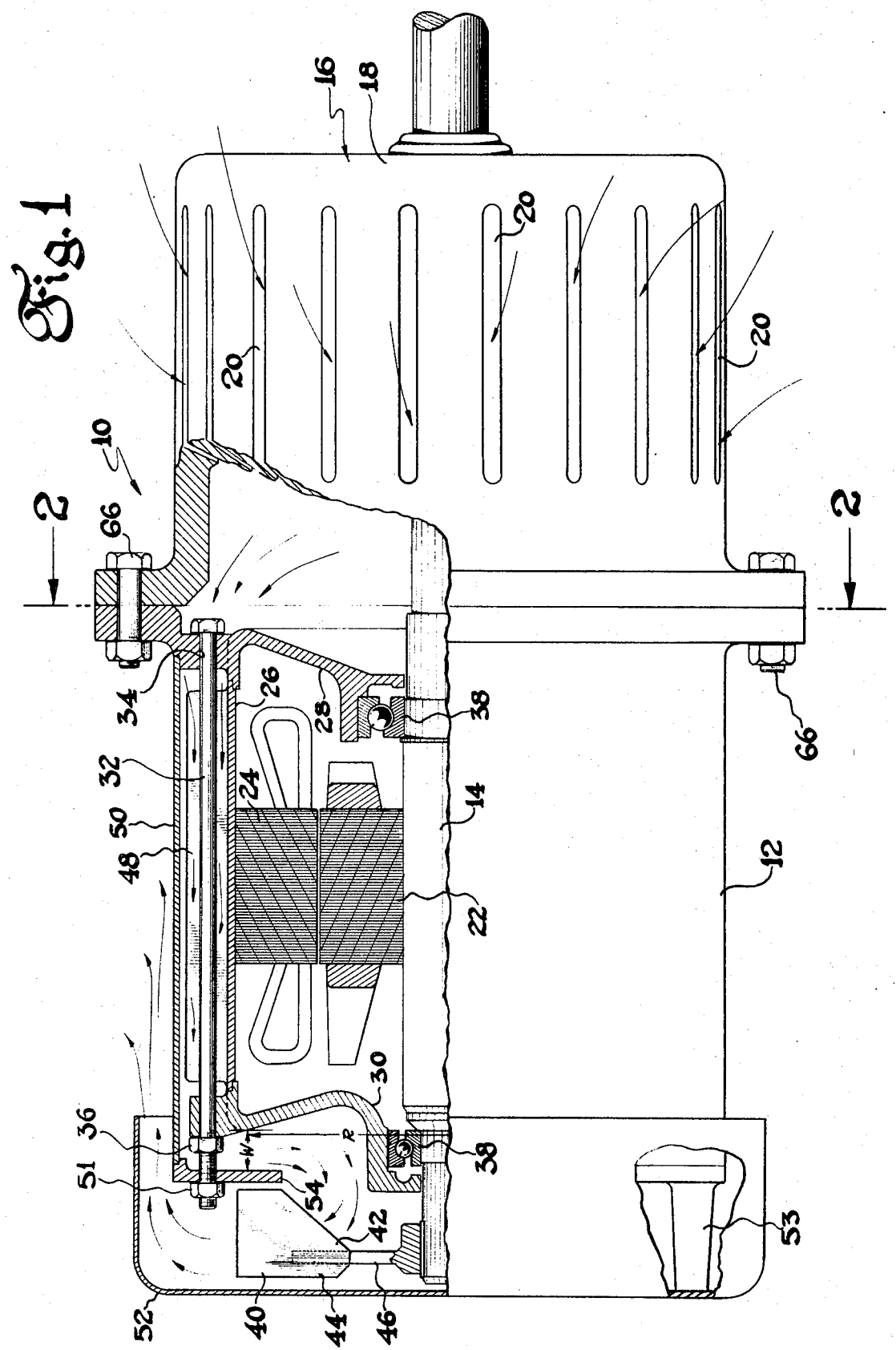

United States Patent [19]
Sieber

[11] 3,748,507
[45] July 24, 1973

[54] VARIABLE SPEED DRIVE HAVING ENHANCED VENTILATION

[75] Inventor: Robert L. Sieber, Fort Wayne, Ind.

[73] Assignee: General Electric Company, Fort Wayne, Ind.

[22] Filed: Dec. 2, 1971

[21] Appl. No.: 204,172

[52] U.S. Cl. .................................................. 310/58
[51] Int. Cl. ............................................. H02k 9/00
[58] Field of Search ................... 310/52, 58, 59, 62, 310/63

[56] References Cited
UNITED STATES PATENTS

| | | | |
|---|---|---|---|
| 2,436,930 | 3/1948 | Mackmann | 310/52 |
| 3,383,530 | 5/1968 | Dunn | 310/52 |
| 2,783,398 | 2/1957 | Haas | 310/58 |
| 3,383,529 | 5/1968 | Baumann | 310/52 |
| 2,494,200 | 1/1950 | Ramqvist | 310/52 |
| 2,469,820 | 5/1949 | Fuge | 310/58 |
| 3,643,119 | 2/1972 | Lukens | 310/63 |

Primary Examiner—R. Skudy
Attorney—John J. Kissane, John M. Stoudt, III and Ralph E. Krisher

[57] ABSTRACT

A variable speed drive is disclosed wherein a single fan mounted at the opposite drive end of a totally enclosed constant speed drive motor is employed to cool both the motor and a transmission unit mechanically coupled to the motor shaft for speed control purposes. Air flows into the transmission unit through apertures in the unit housing and the air is drawn through openings in the end shield separating the motor from the transmission unit to pass axially along an annular zone situated between the finned motor frame and an exteriorly disposed cylindrical shell. A baffle situated at the end of the annular zone remote from the transmission unit then passes the air radially inward before the air is propelled radially outward by the fan to be directed by the fan cover axially down the outer surface of the shell. Desirably, the motor end shield remote from the transmission tapers axially toward the rotor with radial departure from the motor frame to provide substantially uniform air flow resistance throughout the drive.

6 Claims, 2 Drawing Figures

VARIABLE SPEED DRIVE HAVING ENHANCED VENTILATION

This invention relates to a variable speed drive and in particular, to a drive having enhanced ventilation wherein a single fan serves to cool both the electric motor and mechanical transmission unit forming the drive.

Machine tools, such as vertical mills, typically employ a constant speed motor in association with a variable speed transmission, such as a variable pitch pulley arrangement, to obtain the diverse speeds desirable for machining purposes. While cooling of the individual mill components is not extremely difficult in mills of small horsepower ratings, frictional heating of the pulley transmission unit and resistance heating of the motor windings substantially increase when the ratings of the mill become larger, e.g., four horsepower, requiring improved ventilation for the mill. Ventilation problems for the mill also are compounded because the motor drive for the mill typically is mounted at a considerable elevation off the ground and care must be taken that air flow for ventilation purposes does not interfere with operator control of the mill.

Among the numerous ventilation techniques heretofore proposed to cool motors is the utilization of a fan at the air intake end of the machine to propel at least a majority of the air axially along the finned outer periphery of the motor frame. While such ventilation techniques are highly suitable for cooling a motor, *per se*, heat generated within a transmission coupled to the motor would not be significantly dissipated by the air flow and operation of the mill could be limited by transmission heating.

It is therefore an object of this invention to provide a variable speed drive having optimum cooling throughout the entire drive system.

It is also an object of this invention to provide a variable speed drive wherein ventilation is achieved without significant interference with the operator.

It is a still further object of this invention to provide a variable speed drive wherein a single fan is employed to cool the drive motor and variable speed transmission connected thereto.

These and other objects of this invention generally are achieved in a variable speed drive having a constant speed drive motor and a transmission unit coupled to the motor shaft by the utilization of a shaft mounted fan to draw air through apertures within the transmission housing to cool the transmission before propelling the air along an annular zone about the finned motor frame to cool the motor by conduction of heat to the flowing air stream. Preferably, the fan is situated at the end of the motor remote from the transmission unit and a circumferentially disposed shell serves to confine the air stream to an annular region between the stator fins until the air stream reaches a baffle at the end of the motor frame whereupon the air stream is directed radially inward to be centrifugally propelled by the fan against air deflection means to pass in an axially opposite direction along the outer periphery of the stator shell.

Figure 2:
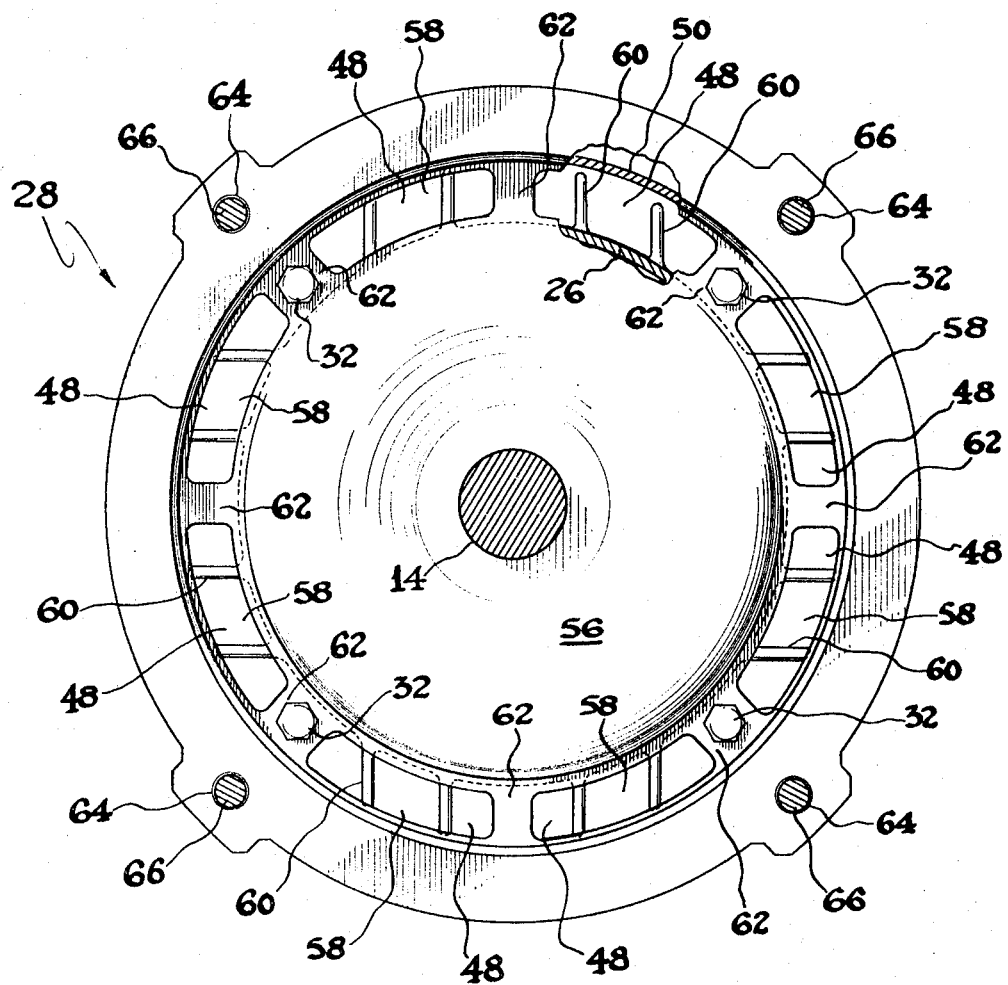

Although this invention is described with particularity in the appended claims, a more complete understanding of the invention may be obtained from the following detailed description of a preferred embodiment of the invention when taken in conjunction with the appended drawings wherein:

FIG. 1 is a partially sectionalized view of a variable speed drive in accordance with this invention, and FIG. 2 is a sectional view taken along lines 2—2 of FIG. 1.

A variable speed drive 10 in accordance with this invention is shown in FIG. 1 and generally includes an induction motor 12 for driving shaft 14 at constant speed and a transmission unit 16 coupled to the shaft to vary the output speed of the drive. The transmission unit can be any mechanical speed changing unit, e.g., a variable pitch pulley arrangement of known design or a gear changing transmission, enclosed within a housing 18 having apertures 20 therein for the admission of cooling air to the transmission unit. Although the apertures are illustrated in FIG. 1 as being elongated slots circumferentially disposed along the wall of the transmission unit, neither the physical location nor the geometry of the apertures are critical to this invention.

Motor 12 can be of any conventional design and is illustrated in FIG. 1 as a totally enclosed squirrel cage induction motor having a rotor 22 mounted upon shaft 14 to apply torque thereto upon energization of the windings within stator 24 circumferentially disposed about the rotor. The outer periphery of the stator is secured within a cylindrical frame 26, preferably of cast aluminum, by a shrink fit to maximize heat conduction therebetween while end shields 28 and 30 are secured at the drive end and opposite drive end, respectively, of the motor frame by any mechanical technique, such as the illustrated rabbet fit with the motor frame, to totally enclose the motor. The end shields also are retained in position by bolts 32 (passing through apertures 34 formed within the end shield) upon tightening of nuts 36 while bearings 38 permit stationary mounting of the end shields about rotatable shaft 14.

Ventilation of the variable speed drive is achieved by a fan 40 mounted upon shaft 14 at the opposite drive end of the motor. The fan is of known design, i.e., a fan such as is disclosed in U.S. Pat. No. 3,383,530 issued to G.B. Dunn, Jr. and assigned to the assignee of the present invention, having axially inner and outer blades 42 and 44, respectively, mounted upon an annular plate 46. Fan 40, however, is disposed upon shaft 14 with the larger fan blades, i.e., axially inner blades 42, proximate the motor to enhance the volume of air drawn through annular zone 48 formed between cylindrical stator frame 26 and concentric stator shell 50. The fan is shrouded by a cover 52 secured to the motor by bolts (not shown) while adapters 53 space the fan cover at the desired distance from the rotary fan. Desirably, cover 52 is unapertured to enhance the suction force of the fan upon annular zone 48 while an annular baffle 54 secured by a rabbet fit to stator shell 50 (as well as by bolts 32 and nuts 51) directs air flowing from the annular zone radially inward toward the axis of the motor. The baffle preferably extends to the axial taper of inner fan blades 42 toward plate 46 to optimize air flow through the drive. Because the drive normally is disposed in a vertical position during operation, the fan cover also serves to totally enclose the fan from falling foreign objects.

As can be seen more clearly in FIG. 2, drive end end shield 28 is characterized by an annular plate section 56 which inhibits air flow into the motor interior while a plurality of generally rectangular apertures 58 along the outer portion of the end shield permit air to flow from the transmission to annular zone 48 between stator frame 26 and stator shell 50. Desirably, the apertures are registered with fins 60 extending outwardly along the outer periphery of the motor frame into annular zone 48 to maximize heat transfer from the frame to the air stream flowing within the annular zone. Alternate ribs 62 of the end shield are apertured to permit bolts 32 to pass therethrough to secure the end shields to the motor frame while radially outer apertures 64 within the flange of the end shield permits transmission unit housing 18 to be fixedly secured to the end shield by bolts 66, illustrated in FIG. 1.

With reference again to FIG. 1, end shield 30 at the opposite drive end of the motor is a solid annular structure having a concave sweep therein to provide a diverging path for air flowing radially inward between baffle 54 and the end shield. Desirably, the sweep of the end shield is at an angle to produce a uniform resistance to air flow notwithstanding the reduction in the circular zone through which the air passes as the air is drawn radially inwardly from annular zone 48. To achieve this uniform air flow resistance, the arithmetic product of the circumference C of a zone at a distance R from the motor axis and the width W of the zone between baffle 54 and end shield 30 should be substantially constant and approximately equal to the product of the mean circumference and radial height of annular zone 48. Preferably, uniform resistance to air flow should extend from frame 26 to a location radially inward of baffle 54 whereat the air stream turns to be propelled centrifugally outward by fan 40. While end shield 28 at the drive end of the motor also is shown as being tapered, such taper is for space conservation purposes and does not affect air flow through the drive.

Because motor 12 normally is mounted at an elevation above the operator's head, it is highly desirable that air exhausted along the outer shell of the motor have a low velocity in order not to interfere with the operator. To achieve this desirable low exhaust velocity, the exhaust region between fan cover 52 and shell 50 should have an area at least equal to the area of air flow between the finned motor frame and the shell. Moreover, because heat removal from a surface varies as a function of air velocity, the exhaust region from the drive motor preferably should have an area greater than the annular air flow zone between motor frame 26 and shell 50 in order to maximize the air velocity adjacent the frame.

During operation of motor 12, air (the flow of which is illustrated by the arrows in FIG. 1) is admitted into transmission unit 16 through apertures 20 and passes therethrough to cool the the mechanical gearing before flowing through rectangular apertures 58 in end shield 28 into annular zone 48. The air flow then continues along the annular zone to accept heat from frame 26 and fins 60 before arriving at the opposite drive end of the annular zone whereat baffle 54 turns the air stream radially inward toward motor shaft 14. Because of the concave sweep of end shield 30 toward the motor rotor with increased departure from frame 26, resistance to air flow between the baffle and the end shield remains substantially equal to air flow resistance in annuar zone 48. Fan 40 then draws the air about baffle 54 and propels the air circumferentially outward where the air is intercepted by fan cover 52 and directed in an axial direction down the radially outer surface of stator shell 50.

Although air flow through the drive is achieved primarily by suction created at the opposite drive end of the motor as fan 40 propels heated air from the motor, air flow across the motor frame also is enhanced by natural convection resulting from heat transfer from the motor frame to the adjacent air stream. Thus, as heat is absorbed by the air in annular zone 48, the heated air tends to rise naturally to the opposite drive end of the vertically disposed motor for exhaust by fan 40.

While a preferred embodiment of this invention has been shown and described, it will be apparent to those skilled in the art that many changes and modifications may be made without departing from this invention in its broader aspects. For example, fan 40 could be mounted at the drive end of the motor to propel air down the permit unrestricted frame and/or stator shell 50 could be removed to permitunrestricted flow of air between the fins. The appended claims therefore are intended to cover all such changes and modifications as fall within the true spirit and scope of this invention.

What I declare as new and desire to secure by Letters Patent of the United States is:

1. A variable speed drive having improved ventilation comprising:
   a constant speed drive motor having a cylindrical frame in contact with the stator laminations of said motor, the outer periphery of said frame containing a plurality of outwardly extending fins to maximize heat transfer to an air stream passing axially between the fins;
   a transmission unit coupled to the shaft of said motor to convert the constant speed of the motor shaft to a variable speed output from the transmission unit;
   means securing the housing of said transmission unit to the housing of said motor;
   aperture means within said transmission unit housing for admitting air to the variable speed drive transmission unit;
   a fan mounted upon said motor shaft remote from the transmission unit for drawing air from said variable speed transmission unit housing and propelling said air axially along the periphery of said motor housing to cool said motor by conduction of heat from the stator to the flowing air stream; and
   a shell circumferentially enclosing said finned stator frame, said fan directing air from said transmission unit housing through the annular zone between said shell and said stator frame, baffle means at the end of said motor remote from said transmission unit for directing air radially inward, and means circumferentially disposed about said fan for redirecting air passed axially through said annular zone in an axially opposite direction along the outer periphery of said shell.

2. A variable speed drive according to claim 1 wherein the end shield at the end of the motor remote from said transmission tapers axially toward said rotor with decreased radial span of the end shield from the rotor shaft.

3. A variable speed drive having enhanced ventilation comprising:
   a. a constant speed motor having an axial shaft, a rotor mounted upon said shaft to apply torque thereto and a stator circumferentially disposed about said rotor, b. a motor housing including a cylindrical stator frame contacting the outer periphery of said stator and having a plurality of fins extending outwardly therefrom, c. a cylindrical shell disposed concentrically about said stator frame, d. a transmission unit coupled to said motor shaft for converting the constant speed of said motor shaft to a variable speed output from said transmission unit, e. a housing enclosing said transmission unit, said transmission unit housing having apertures therein to permit air flow into said transmission unit, f. an end shield situated between said transmission unit and said motor, said end shield blocking air flow from said transmission unit housing to said motor housing while having apertures at a radial location substantially in registration with said fins along the exterior of said motor frame, g. fan means mounted on said motor shaft to draw air through said end sheild apertures axially down the zone between said stator frame and shell to cool said motor by conduction of heat from said frame to said flowing air stream, and h. means situated at the end of said motor remote from said transmission unit for directing air passed through said zone in an axially opposite direction along the outer periphery of said stator shell.

4. A variable speed drive according to claim 3 wherein the end shield at the motor end remote from said transmission unit tapers axially away from said motor with radial departure of the end shield from said shaft and further including baffle means situated adjacent said tapered end shield for directing air passed through the zone between the frame and shell radially inward toward said motor shaft.

5. A variable speed drive according to claim 4 wherein said fan is a radial fan disposed at an axially outward location relative to said baffle means and the fan is characterized by inner and outer blades projecting in axially opposite directions from a radially extending plate, the inner blades proximate the rotor extending over an axial span greater than the outer blades remote from the rotor.

6. A variable speed drive according to claim 4 wherein the means at the end of said motor remote from said transmission unit for directing air along the outer periphery of the stator shell includes a fan cover shrouding said fan means, said fan cover having an open end circumferentially disposed about said stator shell, the area between said fan cover and said shell being at least equal to the annular air flow zone between the frame and the stator shell.

* * * * *